United States Patent Office 2,773,348
Patented Dec. 11, 1956

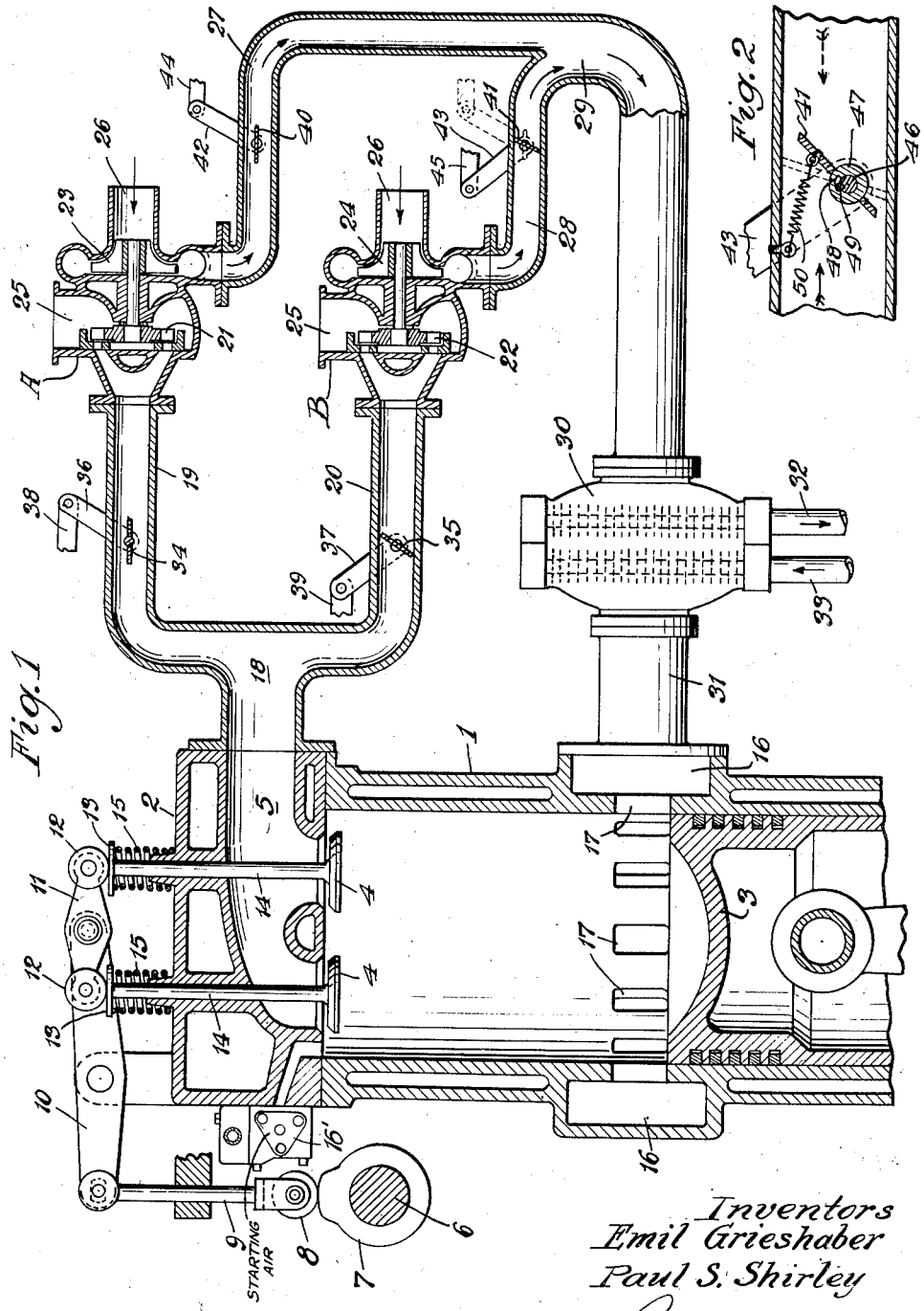

2,773,348

TURBO-CHARGER SYSTEM, INVOLVING PLURAL TURBINE DRIVEN SUPERCHARGERS

Emil Grieshaber and Paul S. Shirley, Milwaukee, Wis., assignors to Nordberg Manufacturing Co., Milwaukee, Wis., a corporation of Wisconsin Application March 27, 1952, Serial No. 278,845

11 Claims. (Cl. 60—13)

Our invention relates to a turbo-charger system for self-sustained, self-starting, two cycle engines. It is well known that supercharging an internal combustion engine results in great increase in power and improvement in efficiency. Many efforts have been made to supercharge two cycle internal combustion engines where a turbo-charger is actuated by the exhaust of the engine to provide scavenging and supercharging air. Heretofore such efforts have always required the addition of some other element to provide scavenging and supercharging air during starting and at low loads.

One purpose of the invention is therefore to provide an exhaust operated turbo-charger for use with two cycle internal combustion engines wherein no additional means are required for providing the supercharging air during starting and low load operation. In other words, the invention involves the provision of an exhaust operated turbo-charger which will be self-sustaining in operation throughout the entire range of engine operation.

We propose to accomplish this by using a plurality of turbo-chargers, each of them driven by the engine exhaust, but propose to use less than the total number of turbo-chargers during starting and no or low load operation. In order to bring this about, we propose to insert in the connection between the engine exhaust and the turbine side of the turbo-chargers, control valves which may be manipulated either manually or in response to the load or speed controls to close off some but never all of the turbines of the turbo-chargers. Under these circumstances at no load or low load, the limited amount of exhaust gas or engine starting air will pass through less than the total number of turbines, thus enabling the turbine or turbines actually in operation to utilize to a greater extent the available energy of the exhaust gas or starting air.

We propose also to provide between the discharge blower outlets of each turbo-charger and the supercharging manifold, automatic balanced flow check valves, which valves will automatically prevent at all times air back flow into the blower discharge outlet from the scavenging manifold.

The reason for such check valves is that as the engine is started with starting air or as the engine is operating at low loads or low speeds, the pressures on the exhaust and scavenging sides of the engine may come so near to balance that the turbine and blower sides of the turbo-charger may be subjected to such pressures, that the turbo-charger will either not operate at all or operate too slowly to build up the essential scavenging pressure.

Even if a single turbo-charger were used and if there is no obstruction to air flow between the turbine of the turbo-charger and the exhaust manifold and between the blower of the turbo-charger and the scavenging manifold, the starting air supplied to the engine cylinder may travel both ways from the engine to the turbine and to the blower and so a gross waste of available energy takes place. The only difference in the pressure effect on both sides of the turbo-charger will represent the pressure loss in the ducts between the engine and the blower. Also the different efficiencies of the turbine active as a turbine and the blower acting as a turbine will result, as best, in a very slow rotary speed of the turbo-charger.

When, however, an automatic check valve is inserted between the blower and the engine, then all the starting air is compelled to pass through the turbine, and the blower resistance will be merely the frictional resistance of the air in the blower housing, and thus the turbine can speed up under the influence of starting air without resultant waste of available energy to a point at which the automatic flow check valve will open and allow air delivery when the engine scavenging and supercharging system pressure is exceeded by the blower delivery pressure.

When a plurality of turbines are used each of them will have a check valve between the blower discharge and the engine. When all of the starting air is supplied to a single turbine, then because of the increased pressure in the system resulting from the reduction of flow areas the single turbine taking the entire discharge of starting air, the one turbine in operation is able to come up to blower discharge speed with a minimum of delay and loss of energy. When a plurality of turbo-chargers are used, the fly wheel effect of one turbo-charger in operation for starting is much less than the fly wheel effect of a single turbo-charger large enough to carry the entire load. This reduced fly wheel effect, as a result of using a multiplicity of smaller turbo-chargers, permits easier starting of the turbo-charger because of the reduced resistance to the acceleration rate.

Thus we have available from the starting air a greatly increased horsepower energy level to provide a sufficient discharge of scavenging and supercharging air from the one turbo-charger to support combustion. Then as the engine comes up to speed, the time comes when it is necessary, in order to handle the exhaust, to use all the turbines and the idle turbine or turbines will then be cut in and continue to discharge scavenging air to the engine.

We have referred above to starting air because our invention is especially important in connection with starting up a two cycle diesel engine. However, there are circumstances involving low load or low speed operation where the exhaust gas is inadequate to drive all the turbines to furnish scavenging and supercharging air so the operation is generally the same as at low load and low speed conditions when starting.

The invention is illustrated more or less diagrammatically in the accompanying drawings, wherein:

Figure 1 is a section through an engine embodying the invention;

Figure 2 is a section on an enlarged scale, showing the balanced control valve used in the exhaust ducts for both blowers of the turbo-chargers with the invention.

Like parts are indicated by like characters throughout the specification and drawings.

1 is an internal combustion engine cylinder, 2 the cylinder head, 3 the piston. 4, 4 are exhaust valves in the cylinder head controlling an exhaust passage 5. 6 is the engine cam shaft carrying a cam 7 engaged by a roller 8 on push rod 9 which actuates a rocker arm 10 on the opposed end of which is pivoted a lever 11 having at its ends rollers 12 engaging tappets 13 on valve stems 14, the valves being normally held closed by valve springs 15 in the usual manner. 16 is the intake or scavenging manifold. A conventional source of starting air is indicated generally at 16'. Ports 17 in the cylinder wall connect the cylinder and the manifold 16 may be opened and closed by the piston 3. 18 is an exhaust manifold communicating with the exhaust passage 5 in the cylinder head 2. The exhaust manifold is bifurcated and each branch 19 and 20 communicates respectively with exhaust turbines 21 and 22 which with blowers 23 and 24 define a plurality of turbo-chargers. The engine exhaust gas escapes from the turbines through the exhaust manifolds 25. Air enters the blowers through the intake manifolds 26 and is discharged from blower 23 through duct 27 and from blower 24 through duct 28, the two ducts joining in a scavenging duct 29 supplying scavenging and supercharging air through the inter-cooler 30 to duct 31, and thence to the scavenging or intake manifold 16. 32, 33 are pipes through which coolant enters and leaves the inter-cooler 30.

34, 35 are block valves adapted to open and close the passages 19 and 20. These block valves are actuated by levers 36, 37 and linkage 38, 39, which may be properly actuated by any suitable engine mechanism or may be manually controlled, as the case may be. The details of this construction are not illustrated, as they form no part of the present invention.

The point is that for starting and for low load, one or the other of the block valves will be closed so that the entire exhaust will pass through one of the turbo-chargers only. 40, 41 indicate balanced flow check valves in the ducts 27, 28 which respond automatically to an unbalance of pressure at the blower discharge.

While the balance flow check valves are able to operate automatically and while they are normally closed unless opened by the pressure of the blower discharge reaching a predetermined point, there may be circumstances when it will be desirable to lock the check valves or control them by manual means, for example when it is desirable to get one turbocharger up to a speed that gives a charging pressure substantially in excess of that required to sustain the engine before the other turbocharger is brought in, or when it is desirable to get one turbocharger up to a greater speed than that required to sustain the engine before opening either of the valves 40 and 41.

Referring to Figure 2, it will be noted that the valve 41 is rotatable on the shaft 46, being mounted on a hub 47, which is recessed at 48 so that the key 49 on the shaft 46 may move angularly through a narrow range without rotating the hub 47. The upper portion of the valve, as indicated, is of greater area than the lower portion so that when pressure is applied in the direction of the dotted arrow, the valve tends to seat automatically against the tension of the spring 50. However, when pressure is enough greater in the direction of the solid line arrow, the valve unseats to permit scavenging and supercharging air to be discharged by the turbo-charger. Under some circumstances it may be desirable to manually or otherwise control the valve independent of the operation of the turbo-charger, for example when it is desirable to get one turbocharger up to a speed that gives a charging pressure substantially in excess of that required to sustain the engine before the other turbocharger is brought in, or when it is desirable to get one turbocharger up to a greater speed than that required to sustain the engine before opening either of the valves 40 and 41. The control mechanism shown makes this possible but leaves the valve at all times, unless the control lever is actuated, to respond to the pressure conditions in the turbo-charger system.

The tension of the spring 50 will be such as to hold the valve closed until rotary speed of the blower is sufficient to build up the discharge pressure of the blower to the point at which it will furnish sufficient scavenging and supercharging air for engine operation.

The use and operation of the invention are as follows:

With the engine at rest, the operator makes sure that block valve 35 is closed, this being done either manually or automatically in consonance with the other engine controls. At that time valves 40 and 41 also remain closed. Thus, the only communication between the engine and the turbo-charger A is through the passages 5, 18, and 19. There is no open communication between the engine and the turbo-charger B.

Starting air under pressure is then admitted to first one and then another of the engine cylinders in the usual manner to rotate the crank shaft. This causes the usual sequence of opening and closing of the scavenging ports and the exhaust ports. As soon as the engine begins to rotate, exhaust air passes out to drive the turbine. This causes rotation of the blower 23, but since the valve 40 is closed, air is not discharged and so the load on the blower and the resistance to rotation of the turbo-charger is only the air resistance or friction resistance in the blower. This continues until the exhaust from the engine cylinders brings the turbo-charger up to a speed at which the discharge pressure from the blower 23 is greater than the pressure on the scavenging system side at this time. At that point, the check valve 40 opens to permit the blower to supply scavenging and supercharging air to the engine sufficient as the speed rises to support combustion. At or about that time, the starting controls will supply fuel to the engine and cut off starting air and the engine then operates on fuel with sufficient air being supplied from the blower of the single turbo-charger.

As the engine picks up speed and load, the controls will subsequently open the valve 35 and cause the turbocharger B to receive some of the exhaust gas so as to bring it up to a speed such that blower 24 will generate enough pressure to open valve 41 under which circumstance both turbo-chargers remain in operation supplying scavenging and supercharging air to the engine.

If subsequently the load falls to a point at which the supply of exhaust gas is insufficient to drive both turbochargers effectively, one block valve can be closed and operation will continue on a single turbo-charger until the load on the engine results in increase in exhaust back pressure to a normal where and when both turbo-chargers will again operate.

Under ordinary circumstances, the balanced flow check valves will operate automatically and the controls 44, 45 will usually be set so as to leave the check valves free to do so. Under some circumstances, however, the automatic effect of the pressures on these check valves may be overcome either manually or by the action of the controls.

Under some circumstances, it is possible that but a single turbo-charger might be used. Ordinarily, at least two will be provided though there may be a multiplicity depending on engine design. If there were a multiplicity of turbo-chargers, more than one might be used for starting but the principle is the same. In every case where a plurality of turbo-chargers is involved, all of them are needed for ordinary operation during the usual working load range, but only some of them, perhaps only one of them, is needed and used during low load and starting operation.

If but a single turbo-charger were used, the block valve between the turbo-charger and the exhaust manifold would not be used, but in every case the balanced check valve is essential. Under low load or starting conditions, with a two cycle engine where the exhaust and scavenging ports are, for part of the cycle, simultaneously opened, it is possible for air to travel from the engine toward the turbines through the ducts 5, 18, 19 and 20 and also through the port 17, scavenging manifold 16, and ducts 21 and 29. When this happens, the pressures on both sides of the turbo-charger may be so nearly balanced that the exhaust gas discharged to the turbine will be unable to bring the turbo-charger up to speed. With the check valves in operation, there can be no resistance to blower rotation resulting from pressure on the scavenging side of the engine, and the exhaust has opportunity to bring the turbo-charger up to the speed at which time it will furnish scavenging and supercharging air to the engine.

We claim:

1. The combination with a two cycle supercharged engine of a plurality of exhaust driven turbo-chargers, there being exhaust passages from the engine to the turbine of each turbo-charger and scavenging passages from the blower of each turbo-charger to the engine, valve means in each of the exhaust passages adapted to prevent flow of exhaust gas to at least one of the turbines and valve means in the scavenging passages between each blower and the engine to prevent counter flow of starting air from the engine to the blower during starting.

2. The combination with a two cycle supercharged engine of a plurality of exhaust driven turbo-chargers, there being exhaust passages from the negine to the turbine of each turbo-charger and scavenging passages from the blower of each turbo-charger to the engine, valve means in each of the exhaust passages adapted to prevent flow of exhaust gas to at least one of the turbines during starting and low load operation of the engine and valve means in the scavenging passages between each blower and the engine to prevent counter flow of starting air from the engine to the blower during starting.

3. The combination with a two cycle supercharged engine of a plurality of exhaust driven turbo-chargers, there being exhaust passages from the engine to the turbine of each turbo-charger and scavenging passages from the blower of each turbo-charger to the engine, a source of starting air, valve means in each of the exhaust passages adapted to prevent flow of exhaust gas and starting air to at least one of the turbines, and means to prevent back flow of gas and starting air from the engine to each of the blowers during starting.

4. The combination with a two cycle supercharged engine of a plurality of exhaust driven turbo-chargers, there being exhaust passages from the engine to the turbine of each turbo-charger and scavenging passages from the blower of each turbo-charger to the engine, a source of starting air, valve means in each of the exhaust passages adapted to prevent flow of exhaust gas and starting air to at least one of the turbines during starting and low load operation of the engine, and valve means to prevent back flow of gas and starting air from the engine to each of the blowers.

5. The combination with a two cycle supercharged engine of a plurality of exhaust driven turbo-chargers, there being exhaust passages from the engine to the turbine of each turbo-charger and scavenging passages from the blower of each turbo-charger to the engine, a source of starting air, means to prevent back flow of gas and starting air from the engine to each of the blowers, said means including a balanced flow check valve biased to closed position and adapted to open to permit air flow only when the pressure of air discharged by the blower exceeds the pressure on the intake side of the engine.

6. The combination with a two cycle supercharged engine of a plurality of exhaust driven turbo-chargers, there being exhaust passages from the engine to the turbine of each turbo-charger and scavenging passages from the blower of each turbo-charger to the engine, valve means in at least one of the exhaust passages to prevent flow of exhaust gas to at least one of the turbines, and means to prevent back flow of gas from the engine to each of the blowers during starting, said means including a balanced flow check valve biased to closed position and adapted to open to permit air flow only when the pressure of air discharged by the blower exceeds the pressure on the intake side of the engine.

7. The combination with a two cycle supercharged engine of a plurality of exhaust driven turbo-chargers, there being exhaust passages from the engine to the turbine of each turbo-charger and scavenging passages from the blower of each turbo-charger to the engine, valve means in each of the exhaust passages adapted to prevent flow of exhaust gas to at least one of the turbines during starting and low load operation of the engine, and automatic means to prevent back flow of air from the engine to each of the blowers, said means including a balanced flow check valve biased to closed position and adapted to open to permit air flow only when the pressure of air discharged by the blower exceeds the pressure on the intake side of the engine.

8. In combination, an internal combustion engine, having exhaust and scavenging headers, a plurality of turbo-chargers, connections between the turbine of each turbo-charger and the exhaust header, block valves in each of said connections, connections between the blower discharge outlets of each turbo-charger and the scavenging header, an automatic balanced flow check valve in each said connection adapted to prevent back flow of gas from the scavenging header into the blower discharge outlet during starting and automatically to open when the blower delivery pressure is greater than the pressure in the scavenging header.

9. The combination with a two cycle super-charged engine of a plurality of exhaust driven turbo-chargers, there being exhaust passages from the engine to the turbine of each turbo-charger and scavenging passages from the blower of each turbo-charger to the engine, a valve in each passage, and means for opening at least one exhaust passage valve during such time as engine load and speed are below a predetermined minimum.

10. The method of starting a supercharged engine with a plurality of exhaust driven turbo-chargers, there being exhaust passages from the engine to the turbine of each turbo-charger and scavenging passages from the blower of each turbo-charger to the engine, comprising the following steps: blocking the scavenging passages for all the turbo-chargers, blocking all but one of the exhaust passages, applying starting air to the engine so that one of the turbo-chargers will come up to speed rapidly and opening the scavenging passage for the said one turbo-charger when the pressure from its blower exceeds the pressure of the starting air.

11. The method of operating a two cycle supercharged engine with two exhaust driven turbo chargers, there being exhaust passages from the engine to the turbine of each turbo-charger and scavenging passages from the blower of each turbo-charger to the engine, comprising the following steps: blocking the scavenging passages for both turbo-chargers and the exhaust passage for one of the turbo-chargers, applying starting air to the engine, so that the other turbo-charger will come up to speed rapidly, and opening all passages when the said other turbo-charger has a blower pressure greater than the pressure of the starting air.

References Cited in the file of this patent

UNITED STATES PATENTS

| | | |
|---|---|---|
| 2,082,780 | Büchi | June 8, 1937 |
| 2,201,682 | Johansson | May 21, 1940 |
| 2,245,163 | Smith | June 10, 1941 |
| 2,296,268 | Büchi | Sept. 22, 1942 |
| 2,359,615 | Browne et al. | Oct. 3, 1944 |
| 2,380,777 | Moss | July 31, 1945 |
| 2,582,916 | Taub | Jan. 15, 1952 |
| 2,612,751 | Ballantyne | Oct. 7, 1952 |